US007765561B1

(12) United States Patent
Ellis (10) Patent No.: US 7,765,561 B1
(45) Date of Patent: Jul. 27, 2010

(54) DYNAMICALLY SIZING A COLLABORATION OF CONCURRENT COMPUTING WORKERS BASED ON USER INPUTS

(75) Inventor: Edric Ellis, Huntingdon (GB)

(73) Assignee: The MathWorks, Inc., Natick, MA (US)

(*) Notice: Subject to any disclaimer, the term of this patent is extended or adjusted under 35 U.S.C. 154(b) by 1279 days.

(21) Appl. No.: 11/272,307

(22) Filed: Nov. 10, 2005

(51) Int. Cl.
*G06F 9/38* (2006.01)

(52) U.S. Cl. .................. 719/330; 719/313; 709/201; 709/202; 709/203

(58) Field of Classification Search ............... 719/330, 719/313
See application file for complete search history.

(56) References Cited

U.S. PATENT DOCUMENTS

| | | | | |
|---|---|---|---|---|
| 6,009,455 | A | * | 12/1999 | Doyle .................. 709/201 |
| 7,502,745 | B1 | * | 3/2009 | Shawver et al. ............ 705/1 |
| 2003/0005068 | A1 | * | 1/2003 | Nickel et al. ............ 709/208 |
| 2004/0019514 | A1 | * | 1/2004 | Verbeke et al. .............. 705/9 |
| 2004/0019890 | A1 | * | 1/2004 | Verbeke et al. ........... 718/100 |
| 2004/0098447 | A1 | * | 5/2004 | Verbeke et al. ........... 709/201 |

OTHER PUBLICATIONS

Taura, Kenjiro; Kenji Kaneda; Thoshio Endo; Akinori Yonezawa. "Phoenix: A Parallel Programming Model for Accommodating Dynamically Joining/Leaving Resources". Proceddings of 9th ACM SIGPLAN Symposium on Proincples and Practice of Parallel Programming. Published 2003. [Retrieved online from ACM Sep. 17, 2009]. pp. 216-229.*

Ron Choy. Parallel MatLab: Doing it Right. Draft version published Nov. 27, 2003. [Retrieved from http://math.mit.edu/~edelman/hompage/papers/pmatlab.pdf on Sep. 21, 2009].*
Baldomero, Javier Fernandez. Message Passing Under MatLab. HPCS of ASTC '01. Apr. 22-26, 2001. [Retrieved online from http://citeseerx.ist.psu.edu/viewdoc/download?doi=10.1.1.22.5378&rep=rep1&type=pdf on Sep. 28, 2009].*
James Arthur Kohl, G.A. Geist. XPVM 1.0 User's Guide (1996). [Retrieved online from http://citeseerx.ist.psu.edu/viewdoc/download?doi=10.1.1.39.7032&rep=rep1&type=pdf on Sep. 28, 2009].*
Elias S. Manolakos. Rapid Prototyping of Matlab/Java Distributed applications using the JavaPorts Components Framework. High Performance Embedded Computing Annual Workshop 2002. Sep. 24-26, 2002. [Retrieved from http://www.II.mit.edu/HPEC/agendas/proc02/presentations/pdfs/4.4-manolakos.pdf on Sep. 22, 2009].*
Jeff Squyres. "The Spawn of MPI". ClusterWorld Magazine (Feb. 2005). vol. 3, No. 2. pp. 40-42.*

(Continued)

*Primary Examiner*—Hyung S Sough
*Assistant Examiner*—Brian Wathen
(74) *Attorney, Agent, or Firm*—Lahive & Cockfield, LLP; Kevin J. Canning (57) ABSTRACT

A dynamic collaboration of processes in a concurrent computing environment is disclosed. A user can modify the size of collaboration or the number of processes that execute a computational job after the processes have been launched on the concurrent computing environment. A launched or running process can establish a communication channel with other processes in the collaboration so that the launched or running process can join the collaboration to execute the job. The user can also release a process from the collaboration so the released process can join a new collaboration to execute a different job. Once a job is completed, the processes can leave the collaboration, and the processes are then free to join a new collaboration subsequently.

37 Claims, 7 Drawing Sheets

OTHER PUBLICATIONS

Jeff Squyres. "Is Your Application Spawnworthy?". ClusterWorld Magazine (Mar. 2005). vol. 3, No. 3. pp. 2-4.*

Husbands, Parry Jones Reginald, "Interactive Supercomputing," pp. 1-96 (1999).

Kepner, Jeremy, "Parallel Programming with MatlabMPI," retrieved online at: http://www.II.mit.edu/MatlabMPI, (Feb. 27, 2004).

Baldomero, Javier F., "MPI Toolbox for Matlab (MPITB)," retrieved online at http://atc.ugr.es/javier-bin/mpitb_eng, (Feb. 22, 2005).

* cited by examiner

DYNAMICALLY SIZING A COLLABORATION OF CONCURRENT COMPUTING WORKERS BASED ON USER INPUTS

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention generally relates to a concurrent computing environment and more particularly to methods, systems and mediums for providing dynamic collaborations in the concurrent computing environment.

BACKGROUND INFORMATION

MATLAB® is a product of The MathWorks, Inc. of Natick, Mass., which provides engineers, scientists, mathematicians, and educators across a diverse range of industries with an environment for technical computing applications. MATLAB® is an intuitive high performance language and technical computing environment that provides mathematical and graphical tools for mathematical computation, data analysis, visualization and algorithm development. MATLAB® integrates numerical analysis, matrix computation, signal processing, and graphics in an easy-to-use environment where problems and solutions are expressed in familiar mathematical notation, without traditional programming. MATLAB® is used to solve complex engineering and scientific problems by developing mathematical models that simulate the problem. A model is prototyped, tested and analyzed by running the model under multiple boundary conditions, data parameters, or just a number of initial guesses. In MATLAB®, one can easily modify the model, plot a new variable or reformulate the problem in a rapid interactive fashion that is typically not feasible in a non-interpreted programming such as Fortran or C.

As a desktop application, MATLAB® allows scientists and engineers to interactively perform complex analysis and modeling in their familiar workstation environment. With many engineering and scientific problems requiring larger and more complex modeling, computations accordingly become more resource intensive and time-consuming. However, a single workstation can be limiting to the size of the problem that can be solved, because of the relationship of the computing power of the workstation to the computing power necessary to execute computing intensive iterative processing of complex problems in a reasonable time. For example, a simulation of a large complex aircraft model may take a reasonable time to run with a single computation with a specified set of parameters. However, the analysis of the problem may also require the model be computed multiple times with a different set of parameters, e.g., at one-hundred different altitude levels and fifty different aircraft weights, to understand the behavior of the model under varied conditions. This would require five-thousand computations to analyze the problem as desired and the single workstation would take an unreasonable or undesirable amount of time to perform these simulations. Therefore, it is desirable to perform a computation concurrently using multiple workstations when the computation becomes so large and complex that it cannot be completed in a reasonable amount of time on a single workstation.

Message Passing Interface (MPI) is a standard for an interface for message passing. MPI communications have been used for performing message passing between parallel machines or workstations in concurrent computing systems. In conventional concurrent computing systems, computing applications, which make use of MPI communications must be launched using a launcher program (usually called "mpirun" or "mpiexec"). An example of the syntax for calling mpirun is as follows.

mpirun-np<number of processes> <application name and arguments>

Once the applications have been launched on a concurrent computing system, the size of collaboration (the number of processes) is typically fixed for the duration of the applications. This is inconvenient in that if a user wishes to add processes to the concurrent computation, the user must completely repeat the entire launching processes. Therefore, it would be desirable to have a concurrent computing system in which the size of collaboration or the number of processes can be modified dynamically even after the applications have been launched on the concurrent computing system.

SUMMARY OF THE INVENTION

The present invention provides a computing environment in which a large computational job can be performed concurrently by multiple processes. This concurrent computing environment may include a client that creates the job. The job may include one or more tasks. The client may send the job or tasks to the multiple processes for the concurrent execution of the job. In the present invention, the processes may interact with each other, or may communicate with the client or an intermediary agent, such as a job manager, to execute the job. The remote processes execute the job and may return execution results to the client directly or indirectly via the intermediary agent.

The present invention provides a dynamic collaboration of the processes in the concurrent computing environment. The present invention enables a user to modify the size of collaboration or the number of processes that execute the job after the processes have been launched on the concurrent computing environment. The present invention enables a launched or running process to establish a communication channel with other processes in the collaboration so that the launched or running process can join the collaboration to execute the job. The present invention also enables a user to release a process from the collaboration so the released process can join a new collaboration to execute a different job. Once a job is completed, the processes can leave the collaboration and are free to join a new collaboration. As such, the present invention allows a user to dynamically modify the size of the collaboration at any time.

In one aspect of the present invention, a method and a medium holding instructions executable in a computer for performing the method are provided for a dynamic collaboration of concurrent computing programs to execute a computational job in a concurrent computing environment. The method includes the step of launching concurrent computing programs on the one or more computing devices. A number of the concurrent computing programs form a collaboration to execute the computational job. The collaboration includes a first concurrent computing program. The method also includes the step of enabling a second concurrent computing program outside of the collaboration to invoke interface function calls to establish a communication channel with the first concurrent computing program, and hence to dynamically join the collaboration.

In another aspect of the present invention, a method and a medium holding instructions executable in a computer for performing the method are provide for a dynamic collaboration of concurrent computing programs to execute a computational job in a concurrent computing environment. The method includes the step of launching concurrent computing programs on the one or more computing devices. A number of the concurrent computing programs form a collaboration to execute the computational job. The collaboration includes a first concurrent computing program. The method also includes the step of enabling the concurrent computing programs in the collaboration to invoke an interface function call to disconnect a communication channel with the first concurrent computing program, and hence the first concurrent computing program dynamically leaves the collaboration.

In another aspect of the present invention, a system is provided for a dynamic collaboration of concurrent computing programs to execute a computational job in a concurrent computing environment. The system includes a collaboration of concurrent computing programs launched on one or more computing devices to execute a computational job. The collaboration includes a first concurrent computing program. The system also includes a second concurrent computing program outside of the collaboration for invoking interface function calls to establish a communication channel with the first concurrent computing program, and hence joining the collaboration dynamically.

In another aspect of the present invention, a system is provided for a dynamic collaboration of concurrent computing programs to execute a computational job in a concurrent computing environment. The system forms a collaboration of concurrent computing programs launched on one or more computing devices to execute a computational job. The collaboration includes a first concurrent computing program. The concurrent computing programs in the collaboration invoke an interface function call to disconnect a communication channel with the first concurrent computing program, and hence the first concurrent computing program dynamically leaves the collaboration.

With the dynamic collaboration of the present invention, the processes involved in the concurrent computing system can establish a communication channel with other processes after the processes have been launched on the concurrent computing system. Therefore, the processes involved in the concurrent computing system of the present invention need not be launched using the conventional launcher program, such as "mpiexec" or "mpirun," which significantly reduces the initial delay when launching the processes on the concurrent computing system.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DETAILED DESCRIPTION

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The illustrative embodiment of the present invention provides a computing system that enables a user to execute a computational job concurrently using multiple remote workers. A job is a logical unit of activities, or tasks that are processed and/or managed collectively. A task defines a technical computing command, such as a MATLAB® command, to be executed, and the number of arguments and any input data to the arguments. A job is a group of one or more tasks. In the illustrative embodiment, the concurrent computing system may include a client for creating the job. The client may send the job to one or more remote workers for the execution of the job. The remote workers execute the job and return the execution results to the client. The workers may interact with each other, or may communicate with the client or an intermediary agent, such as a job manager, to execute the job. As such, the illustrative embodiment of the present invention executes the job using a concurrent computing system.

The illustrative embodiment of the present invention provides a dynamic collaboration of the workers in the concurrent computing system. The illustrative embodiment enables a user to specify the size of collaboration or the number of workers that execute the job interactively after the workers have been launched. A worker may establish communication channels with other workers in the collaboration so that the worker can join the collaboration to execute the job. The illustrative embodiment also enables a user to release a worker from the collaboration so the released process can join a new collaboration. In the illustrative embodiment, once a job is completed, the workers are released from the collaboration, and they are then free to join a new collaboration. As such, the illustrative embodiment enables the workers in the concurrent computing system to take part in different collaborations in sequence.

The illustrative embodiment will be described solely for illustrative purposes relative to a MATLAB®-based technical computing environment. Although the illustrative embodiment will be described relative to a MATLAB®-based application, one of ordinary skill in the art will appreciate that the present invention may be applied to distributing the processing of technical computing tasks with other technical computing environments, such as technical computing environments using software products of LabVIEW® or MATRIXx from National Instruments, Inc., or Mathematica® from Wolfram Research, Inc., or Mathcad of Mathsoft Engineering & Education Inc., or Maple™ from Maplesoft, a division of Waterloo Maple Inc.

Figure 1:
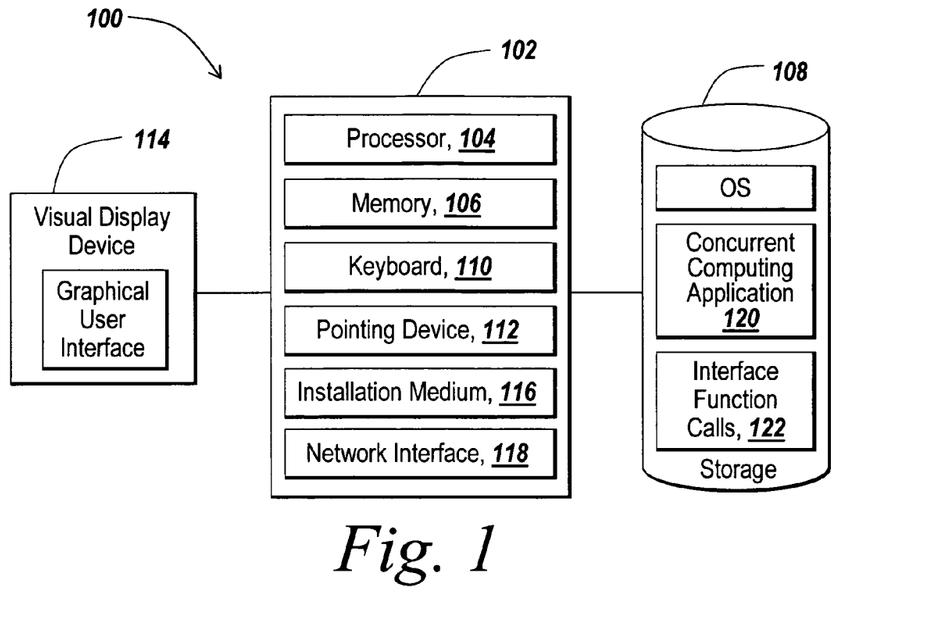
FIG. 1 is a block diagram of a computing device for practicing an embodiment of the present invention.

FIG. 1 depicts an exemplary environment 100 suitable for practicing an illustrative embodiment of the present invention. The environment includes a computing device 102 having memory 106, on which software according to one embodiment of the present invention may be stored, a processor (CPU) 104 for executing software stored in the memory 106, and other programs for controlling system hardware. The memory 106 may include a computer system memory or random access memory such as DRAM, SRAM, EDO RAM, etc. The memory 106 may include other types of memory as well, or combinations thereof. A human user may interact with the computing device 102 through a visual display device 114 such as a computer monitor, which may include a graphical user interface (GUI). The computing device 102 may include other I/O devices such a keyboard 110 and a pointing device 112, for example a mouse, for receiving input from a user. Optionally, the keyboard 110 and the pointing device 112 may be connected to the visual display device 114. The computing device 102 may include other suitable conventional I/O peripherals.

The computing device 102 may support any suitable installation medium 116, a CD-ROM, floppy disks, tape device, USB device, hard-drive or any other device suitable for installing software programs, such as the MATLAB®-based concurrent computing application 120. Moreover, the computing device 102 may be any computer system such as a workstation, desktop computer, server, laptop, handheld computer or other form of computing or telecommunications device that is capable of communication and that has sufficient processor power and memory capacity to perform the operations described herein.

Additionally, the computing device 102 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may include a built-in network adapter, network interface card, PCMCIA network card, card bus network adapter, wireless network adapter, USB network adapter, modem or any other device suitable for interfacing the computing device 118 to any type of network capable of communication and performing the operations described herein.

The computing device 102 may further include a storage device 108, such as a hard-drive or CD-ROM, for storing an operating system and for storing application software programs, such as the MATLAB®-based concurrent computing application 120. The MATLAB®-based concurrent computing application 120 may run on any operating system such as any of the versions of the Microsoft® Windows operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. Furthermore, the operating system and the MATLAB®-based concurrent computing application 120 can be run from a bootable CD, such as, for example, KNOPPIX®, a bootable CD for GNU/Linux.

Those of skill in the art will appreciate that the computing device 102 may include multiple processors or multiple cores on a single machine, so that multiple concurrent computing applications can be running on the single machine.

The storage device 108 may also store interface function calls 122 that enable the MATLAB®-based concurrent computing application 120 to communicate with other computing applications or processes in a concurrent computing system. The interface function calls 122 provide various function calls for the MATLAB®-based concurrent computing application 120 to establish communication channels with other computing processes, or applications in the concurrent computing system. The interface function calls 122 may be provided as a shared library, such as DLL files on Windows and so files on UNIX. The shared library enables the concurrent computing application 120 to dynamically load and close the interface function calls 122, which is necessary for the concurrent computing application 120 to establish a communication channel when the concurrent computing application 120 joins a new collaboration.

Since the concurrent computing system may require extensive message passing between the computing processes, the interface function calls 122 may include message passing function calls, such as Message Passing Interface (MPI) function calls. MPI is a de facto standard, created by the group of vendors, computer scientists and users making up the MPI Forum. MPI is a message-passing library specification defining a collection of subroutines and arguments used for communication among nodes running a parallel program on a distributed memory system. Implementation of the MPI specification permits programs with separate address spaces to synchronize with one another and move data from the address space of one process to that of another by sending and receiving messages. The interface function calls 122 will be described below in more detail with reference to FIGS. 5-7.

Figure 2:
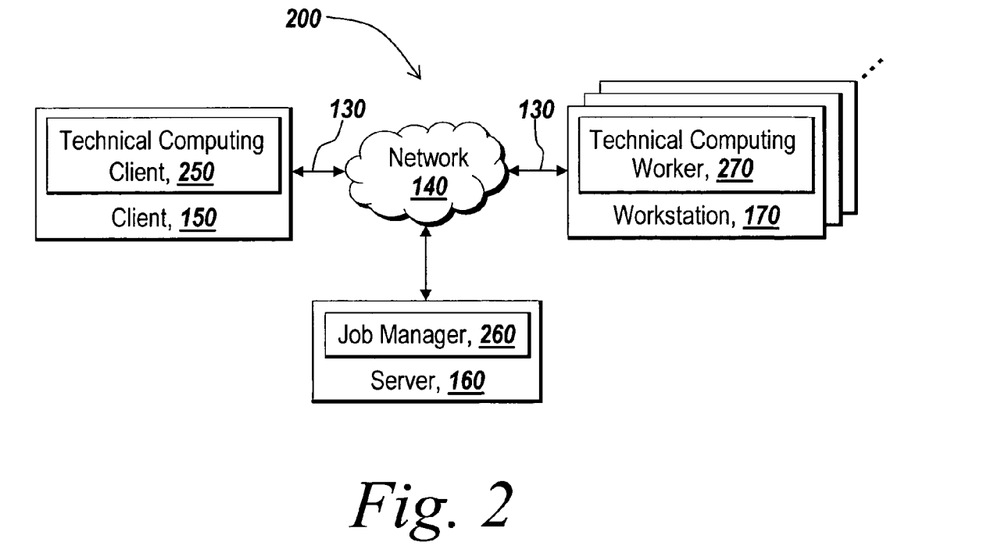
FIG. 2 is a block diagram of a concurrent computing system for practicing an illustrative embodiment of the present invention.

FIG. 2 depicts an exemplary concurrent computing system 200 suitable for practicing the illustrative embodiment of the present invention. In the illustrative embodiment, the functionality of the MATLAB®-based computing application 120 is launched across multiple computing devices. The system 200 may include a client 150 in communications through a network communication channel 130 with workstations 170 over the network 140. The MATLAB®-based concurrent computing application 120 has one or more software components that run on each of the client 150 and workstations 170, and work in communication and in collaboration with each other to meet the functionality of the overall application.

The MATLAB®-based computing application 120 may include a technical computing client application 250, or technical computing client, running on a client 150 computer and a technical computing worker application 270, or technical computing worker, running on a workstation 170. The technical computing client 250 may be in communication through the network communication channel 130 on the network 140 with one, some or all of the technical computing workers 270. The technical computing workers 270 can be hosted on the same workstation, or a single technical computing worker 270 can have a dedicated workstation 170. Alternatively, one or more of the technical computing workers 270 can be hosted on the client 150.

The technical computing client 250 can be a technical computing software application that provides a technical computing and graphical modeling environment for generating block diagram models and to define mathematical algorithms for simulating models. The technical computing client 250 can be a MATLAB®-based client, which may include all or a portion of the functionality provided by the standalone desktop application of MATLAB®. Additionally, the technical computing client 250 can be any of the software programs available in the MATLAB® product family. Furthermore, the technical computing client 250 can be a custom software program or other software that accesses MATLAB® functionality via an interface, such as an application programming, interface, or by other means. One ordinarily skilled in the art will appreciate the various combinations of client types that may access the functionality of the system.

With an application programming interface and/or programming language of the technical computing client 250, functions can be defined representing a technical computing task to be executed by either a technical computing environment local to the client computer 150, or remote on the workstation 170. The local technical computing environment may be part of the technical computing client 250, or a technical computing worker running on the client computer 150. The programming language includes mechanisms to define tasks to be distributed to a technical computing environment and to communicate the tasks to the technical computing workers 270 on the workstations 170, or alternatively, on the client 150. Also, the application programming interface and programming language of the MATLAB®-based client 250 includes mechanisms to receive a result from the execution of technical computing of the task from another technical computing environment. Furthermore, the MATLAB®-based client 250 may provide a user interface that enables a user to specify the size of the collaboration of the technical computing workers 270 for the execution of the job or tasks. The user interface may also enable a user to specify a technical computing worker 270 to be added to the collaboration or to be removed from the collaboration.

The technical computing worker 270 of the system 200 can be a technical computing software application that provides a technical computing environment for performing technical computing of tasks, such as those tasks defined or created by the technical computing client 250. The technical computing worker 270 can be a MATLAB®-based worker application, module, service, software component, or a session, which includes support for technical computing of functions defined in the programming language of MATLAB®. A session is an instance of a running technical computing worker 270 by which a technical computing client can connect and access its functionality. The technical computing worker 270 can include all the functionality and software components of the technical computing client 250, or it can just include those software components it may need to perform technical computing of tasks it receives for execution. The technical computing worker 270 may be configured to and capable of running any of the modules, libraries or software components of the MATLAB® product family. As such, the technical computing worker 270 may have all or a portion of the software components of MATLAB® installed on the workstation 170, or alternatively, accessible on another system in the network 140. The technical computing worker 270 is capable of performing technical computing of the task as if the technical computing client 250 was performing the technical computing in its own technical computing environment. The technical computing worker 270 also has mechanisms, to return a result generated by the technical computing of the task to the technical computing client 250.

A server 160 may be coupled to the network 140. The server 160 may include a job manager 260. The job manager 260 can provide control of delegating tasks and obtaining results in the concurrent computing system 200. The job manager 260 may provide an interface for managing a group of tasks collectively as a single unit called a job, and on behalf of a technical computing client 250, submitting those tasks making up the job, and obtaining the results of each of the tasks until the job is completed. This eases the programming and integration burden on the technical computing client 250. For multiple task submissions from the technical computing client 250, the job manager 260 can manage and handle the delegations of the tasks to the technical computing workers 270 and hold the results of the tasks on behalf of the technical computing client 250 for retrieval after the completion of technical computing of all the tasks.

Although the present invention is discussed above in terms of the MATLAB®-based concurrent computing application across the computing devices of a client 150, server 160 and workstation 170, any other system and/or deployment architecture that combines and/or distributes one or more of the technical computing client 250, job manager 260 and technical computing workers 270 across any other computing devices and operating systems available in the network 140 may be used. Alternatively, all the software components of the MATLAB®-based concurrent computing application can run on a single computing device 102, such as the client 150, server 160 or the workstation 170.

Figure 3:
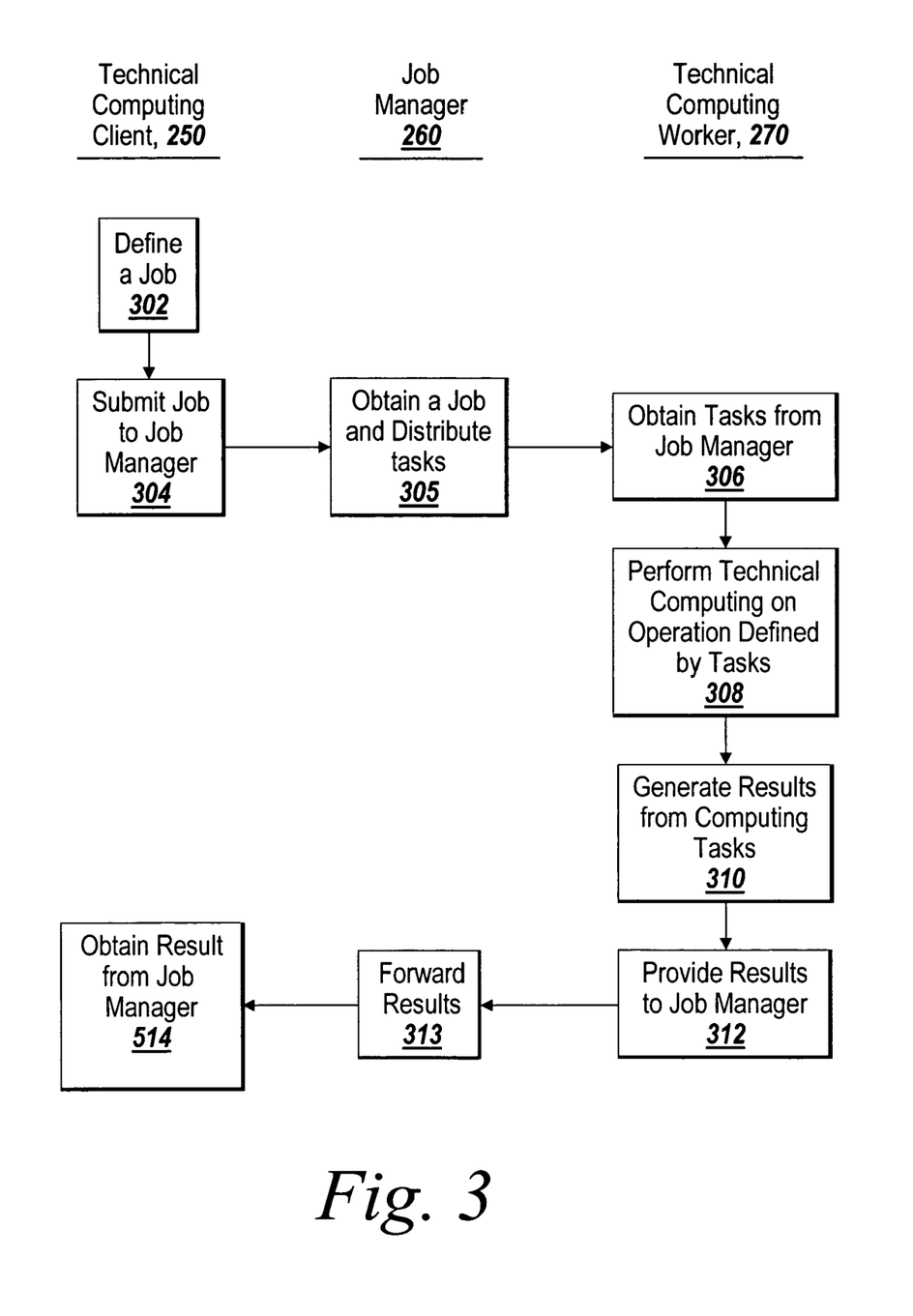
FIG. 3 is a flow chart showing an exemplary operation performed in the embodiment of FIG. 2.

FIG. 3 is a flow chart showing an exemplary operation of the concurrent computing system 200 depicted in FIG. 2. The technical computing client 250 defines a job including operations for technical computing (step 302). The job includes tasks defining functions, commands or operations, such as may be available in the programming language of MATLAB®, and the number of arguments and input data of the arguments. The technical computing client 250 then submits the job (step 304) to the job manager. The job manager 260 obtains the job and distributes the tasks to the technical computing workers 270 (step 305). The technical computing workers 270 receive the tasks (step 306) and perform the requested technical computing as defined by the tasks (step 308). In performing the technical computing on the tasks, associated results may be generated (step 310). In alternative embodiments, either no result is generated, or no result is required to be returned to the technical computing client 250. After generating the results from computing the tasks, the technical computing workers 270 provide the result (step 312) to the job manager 260, which forwards the results to technical computing client 250 (step 313). The technical computing client 250 then obtains the result from the job manager 260 (step 314).

Figure 4:
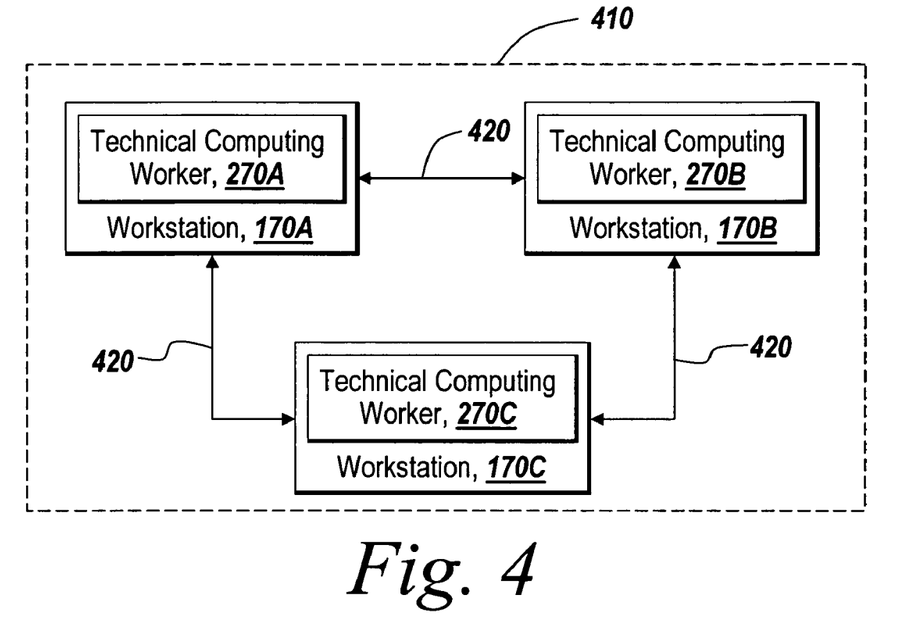
FIG. 4 is a block diagram illustrating the dynamic collaboration of technical computing workers in the illustrative embodiment of the present invention.
Figure 5:
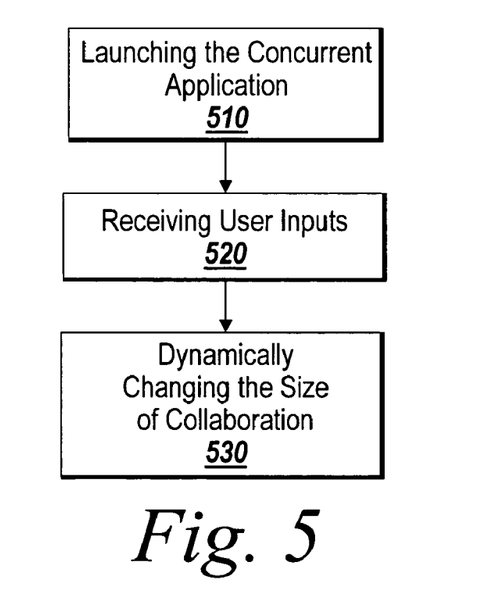
FIG. 5 is a flow chart showing an exemplary operation for providing the dynamic collaboration of technical computing workers in the illustrative embodiment of the present invention.

FIG. 4 is a block diagram illustrating the dynamic collaboration of technical computing workers in an embodiment of the present invention. The workstations 170A, 170B and 170C are coupled to the client 150 or the server 160 via the network 140 as described above with reference to FIG. 2. FIG. 5 is a flow chart showing an exemplary operation of technical computing workers 270 for providing a dynamic collaboration. First, the technical computing workers 270A, 270B and 270C are launched to run on the workstations 170A, 170B and 170C, respectively (step 510). In the illustrative embodiment, the technical computing workers 270A, 270B and 270C need not be launched using the conventional launcher program, such as "mpirun" and "mpiexec," because the illustrative embodiment enables a technical computing worker to establish a communication channel with other technical computing workers after the technical computing workers are launched on the workstation. Therefore, the illustrative embodiment can reduce the initial delay in launching the technical computing workers 270A, 270B and 270C on the workstations 170A, 170B and 170C.

For the dynamic collaboration of the technical computing workers 270A, 270B and 270C, the technical computing workers 270A, 270B and 270C established a communication channel 420 and form a collaboration 410. The technical computing workers 270A, 270B and 270C may communicate via a Message Passing Interface (MPI) communication channel 420. In other embodiments, the technical computing workers 270A, 270B and 270C can interface via socket based communications over TCP/IP implementing a custom message specification. In further embodiments, the technical computing workers 270A, 270B and 270C may communicate using any available messaging communications products and/or custom solutions that allow the execution environments to send and receive messages. In certain embodiments, the communication channel 420 may include a file interfacing mechanism such as reading and writing to files on a network accessible directory or common file system. Furthermore, the technical computing workers 270A, 270B and 270C can each be waiting or listening for messages from other technical computing workers 270A, 270B and 270C. One ordinarily skilled in the art will recognize the various types of interfaces to communicate messages between the technical computing workers 270A, 270B and 270C.

A user can modify or change the size of collaboration by adding another computing resource, such as the technical computing worker 270 running on the workstation 170 (step 520). The user may be provided on the client 150 with a user interface to modify or change the size of collaboration or to designate a specific resource to add to or remove from the collaboration. The client 150 forwards the information to the job manager 260, which determines a technical computing worker to be added to or to be removed from the collaboration. The job manager 260 communicates with the determined technical computing worker, such as the technical computing worker 270. In response, the technical computing worker 270 dynamically joins or leaves the collaboration (step 530), which will be described below in more detail with reference to FIGS. 6 and 7.

Figure 6:
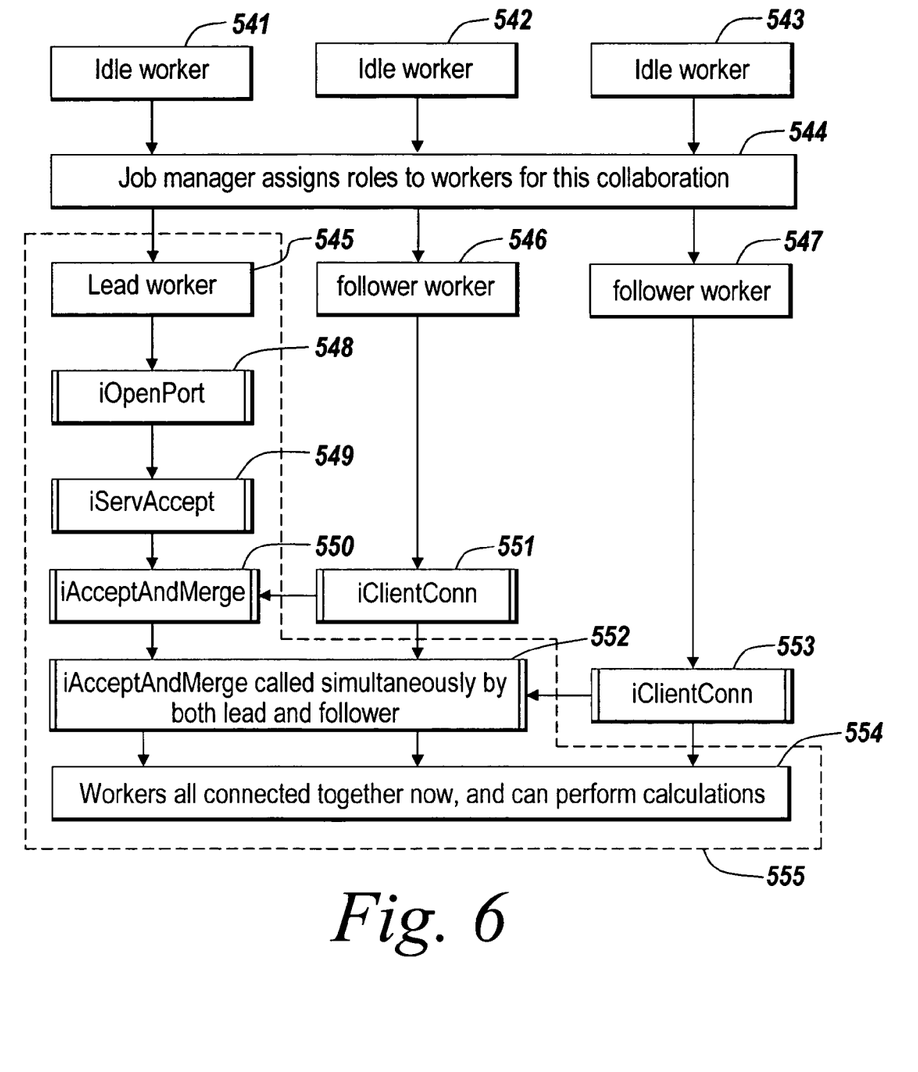
FIG. 6 is a flow chart showing an exemplary operation for adding a technical computing worker to a collaboration.

FIG. 6 is an exemplary operation for the technical computing workers 270A, 270B and 270C from the idle states (steps 541-543) to form a collaboration 410. When a parallel collaboration is required, the job manager 260 (or similar entity) decides which MATLAB worker processes 270A, 270B, 270C are to be involved, and then tells one of them, such as the worker 270A, that it is the "lead" worker (step 545), and that the other workers, such as the workers 270B and 270C, are "follower" workers (steps 546 and 547) for the purposes of connecting the MPI communication ring (step 544). The job manager 260 also tells all workers involved how many workers will be involved in this particular collaboration.

The "lead" worker 545 then calls MPI_Open_port (via the helper function iOpenPort) which returns a description of the port that has been opened (step 548). The format of this description is dependent upon the MPI implementation—a typical implementation will return a hostname and TCP port number. Exemplary code for the iOpenPort function is provided as follows.

```
/*
 * iOpenPort - called by a server to open a port for others to connect to
 * Returns the port description. Clients need to know this in order to
 * call iClientConn, as does iServAccept.
 */
static void iOpenPort( int nlhs, mxArray * plhs[ ] ) {
    char portName[MPI_MAX_PORT_NAME];
    int status;
    status = MPI_Open_port( MPI_INFO_NULL, portName );
        mpiAssert( status, MPIGATEWAY_OPENPORTFAILED );
    /* If we get here, we've opened a port. Return that. */
    if( nlhs == 1 ) {
        plhs[0] = mxCreateString( portName );
    }
}
/*
 * Simple helper for server and client to extract the port name and number
 * of clients from the first two RHS args. This helper function translates
 * the input arguments to the function from the form that they exist in
 * MATLAB to a form useful in a C program.
 */
static void iNameAndNumberHelper( int nrhs, const mxArray *prhs[ ],
                char ** name, int * number ) {
    if( nrhs == 3 &&
        mxIsChar( prhs[1] ) &&
        mxIsNumeric( prhs[2] ) ) {
        /* OK */
        *name = mxArrayToString( prhs[1] );
        mxAssert( *name != NULL, "Failed to allocate memory for
        port name" );
        *number = (int) mxGetScalar( prhs[2] );
    } else {
        mexErrMsgIdAndTxt( MPIGATEWAY_OPENPORTFAILED,
            "Invalid arguments for MPI communicator manipulation" );
    }
}
```

The "lead" worker 545 then calls iServAccept with this port information (step 549) so that it can call iAcceptAndMerge N-1 times where N is the total number of workers to be involved (step 550). The following is exemplary code for iServAccept and iAcceptAndMerge.

```
/*
    *RHS should be an integer specifying how many clients to
expect
    */ static void iServAccept(int nrhs, const mxArray *prhs[ ]) {
    char * portName;
    int numClients, i;
    MPI_Comm comm;
    iNameAndNumberHelper(nrhs,    prhs,    &portName,
&numClients);
    comm=MPI_COMM_WORLD;
    /* Loop, accept, and merge */
    for(i=0; i<numClients; i++) {
        iAcceptAndMerge(portName, &comm);
    }
    /* Have finished with portName allocated by mxArray-
ToString, so free here */
    mxFree(portName);
    iFixUpCommunicators(comm);
}

/* This is used by iServAccept and iClientConn to call accept
and merge

* The communicator is an INOUT argument—we use its
value and modify it

*/
```

```
static void iAcceptAndMerge(char * portName, MPI_
Comm *pComm) {
    MPI_Comm tmp;
    /* Accept the incoming connection */
    mpiAssert(MPI_Comm_accept(portName, MPI_INFO_
NULL, 0, *pComm, &tmp),
        MPIGATEWAY_OPENPORTFAILED);
    /* Merge the communicators */
    mpiAssert(MPI_Intercomm_merge(tmp, 0, pComm),
        MPIGATEWAY_OPENPORTFAILED);
    /* Free the temporary communicator */
    mpiAssert(MPI_Comm_free(&tmp),    MPIGATEWAY_
OPENPORTFAILED);
}
```

Each follower worker is told by the job manager 260 (or some other $3^{rd}$ party communication mechanism) the port description that the lead worker 545 received in return from the call to MPI_Openport. The followers 546 and 547 call iClientConn with this information, which first calls MPI_Comm_connect to connect to the lead worker 545 (steps 551 and 553). Once connected to the lead worker 545, the follower then calls iAcceptAndMerge along with the lead worker to accept the connections from the other followers until all are connected (steps 552 and 554). Each follower calculates the current size of the collaboration, and the expected total size in order to work out how many times they must call iAcceptAndMerge. The region 555 indicates the current collaboration. The following is exemplary code for iClientConn.

```
static void    iClientConn(int    nrhs,    const    mxArray
*prhs[ ]) {
    char * portName;
    int numClients, i, rank, size;
    MPI_Comm tmp, comm;
    iNameAndNumberHelper(nrhs,    prhs,    &portName,
&numClients);
    /* Open a connection */
    mpiAssert(MPI_Comm_connect(portName, MPI_INFO_
NULL, 0,
        MPI_COMM_WORLD, &comm),
        MPIGATEWAY_CLIENTCONNFAILED);
    mpiAssert(MPI_Intercomm_merge(comm, 1, &tmp),
        MPIGATEWAY_CLIENTCONNFAILED);
    comm=tmp;
    /* Check that we can call size and rank */
    mpiAssert(MPI_Comm_size(comm, &size),
        MPIGATEWAY_CLIENTCONNFAILED);
    mpiAssert(MPI_Comm_rank(comm, &rank),
        MPIGATEWAY_CLIENTCONNFAILED);
    /* If we're waiting for other people to connect, then we
need to call
iAcceptAndMerge the same number of times as the lead
worker */
    for(i=rank+1; i<=numClients; i++) {
        iAcceptAndMerge(portName, &comm);
    }
    /* Have finished with portName allocated by mxArray-
ToString, so free here */
    mxFree(portName);
    /* Set up communicators correctly */
    iFixUpCommunicators(comm);
}
```

With the interface function calls 122 invoked by the technical computing workers 270A, 270B and 270C in the collaboration 410, the technical computing workers 270A, 270B and 270C can dynamically establish a communication channel 420 with the other technical computing workers 270A, 270B and 270C, and hence form the collaboration 410 (step 640). Those of skill in the art will appreciate that the interface function calls 122 can be provided on the workstations 170A, 170B and 170C, or at a location on the network 140 that can be accessed by the technical computing workers 270A, 270B and 270C.

Figure 7:
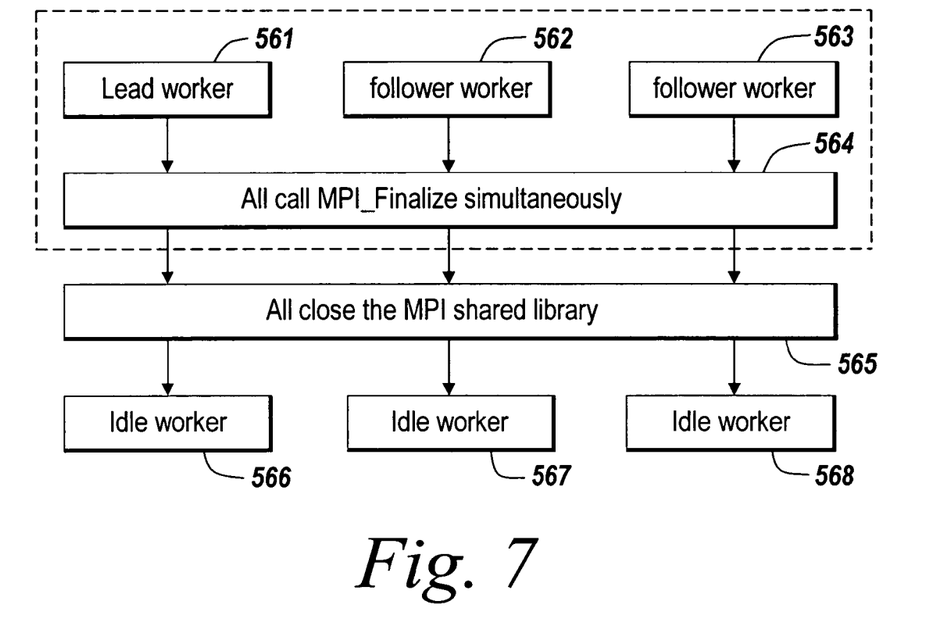
FIG. 7 is a flow chart showing an exemplary operation for releasing a technical computing worker from a collaboration.

The illustrative embodiment also enables technical computing workers in the collaboration 410 to leave the collaboration. FIG. 7 is a flow chart showing an exemplary operation for technical computing workers to leave the collaboration. When a job has been performed by a collaboration, the workers in the collaboration close down the communication channel together. The workers are then free to be re-assigned for other collaborations. (In particular, a worker that was once the lead worker need not be the lead worker in a future collaboration). Assuming that the technical computing workers 270A, 270B and 270C have executed a job and are leaving the collaboration, the technical computing workers 270A, 270B and 270C invoke an interface function call (MPI_Finalize) for disconnecting the communication channel with the other technical computing workers 270A, 270B and 270C in the collaboration (step 564). The technical computing workers 270A, 270B and 270C close the MPI shared library (step 565). When the communication channel 420 between the technical computing workers 270A, 270B and 270C is disconnected, the technical computing workers 270A, 270B and 270C are idle (steps 566-568) and independent of the collaboration 410 and can join a new collaboration at any time.

The illustrative embodiment may provide user APIs that enable a user to launch technical computing workers by specifying additional command-line flags. The first command-line flag may be "-numlabs" which a user can define in order to indicate the desired total number of technical computing workers to be launched. In this case, the user executes a command line as follows.

matlab-numlabs 3

Figure 8:
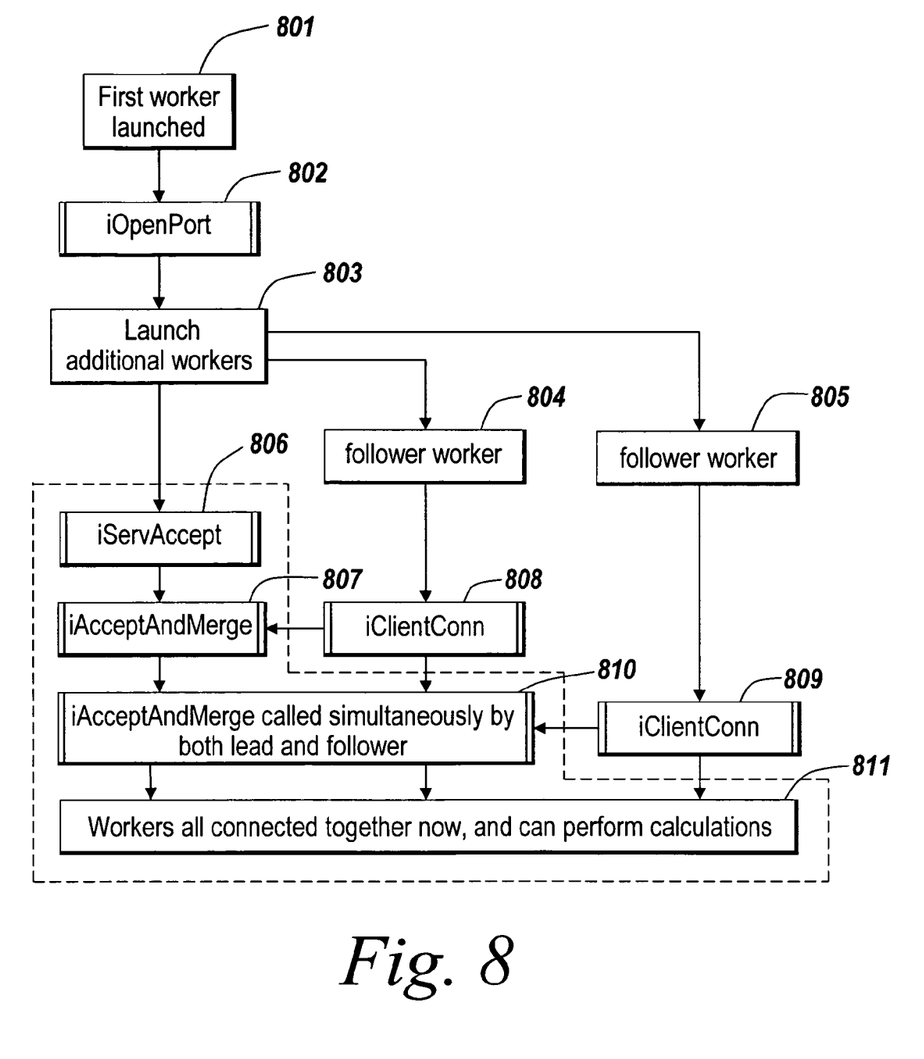
FIG. 8 is a flow chart showing an exemplary operation for executing a user API in the illustrative embodiment.

FIG. 8 is a flow chart showing an exemplary operation for executing the command line in the illustrative embodiment. The command line first launches a first technical computing worker (step 801). The first technical computing worker calls the internal function "iOpenPort" to create the port on which it will accept connections from the other technical computing workers (step 802). Once the first technical computing worker has been launched, and additional two technical computing workers 804 and 805 are launched by the first technical computing worker (step 803). The port information of the first technical computing worker is then passed (using an environment variable, or some other means) to the additional technical computing workers 804 and 805. The first technical computing worker then calls "iServAccept" (step 806), and the additionally launched workers 804 and 805 call "iClientConn" (steps 808 and 809). The operations of the other steps 807, 810 and 111 are the same as described above with reference to FIG. 6.

The second command-line flag may be "-ParallelConfig" which allows a user to specify a particular configuration to be used when launching technical computing workers. In this case, the user executes a command line as follows.

matlab-ParallelConfig myConfig

Figure 9:
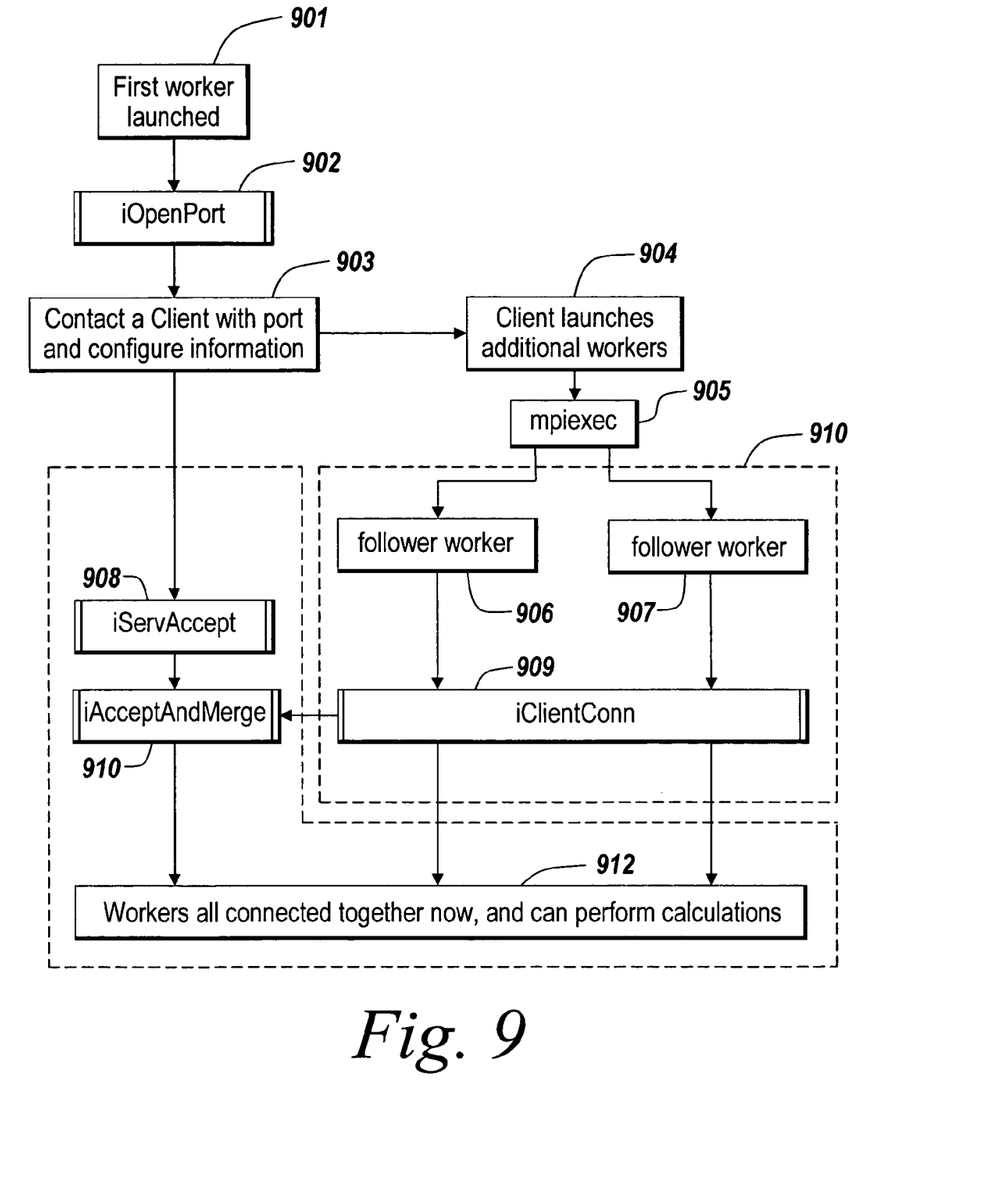
FIG. 9 is a flow chart showing an exemplary operation for executing another user API in the illustrative embodiment.

FIG. 9 is a flow chart showing an exemplary operation for executing the command line in the illustrative embodiment. This command line launches a first technical computing worker (step 901). The first technical computing worker calls the internal function "iOpenPort" to create the port on which it will accept connections from the other workers (step 902). Once the first technical computing worker has been launched, it contacts the technical computing client with the configuration "myConfig" (step 903). This configuration may contain information about the scheduler to be used, as well as how many additional technical computing workers to launch. The technical computing client takes this configuration, and launches the necessary computing workers (step 904). In the illustrative embodiment, "mpiexec" is specified as the scheduler (step 905) to launch the additional workers 906 and 907. The port information of the first worker is passed to the technical computing client which disseminates the information to all technical computing workers launched. The first technical computing worker then calls "iServAccept" to allow the other technical computing workers to connect (step 908). The additional technical computing workers 906 and 907 call "iClientConn" to connect (909).

Although "mpiexec" is specified as the scheduler to launch the additional workers 906 and 907 in the illustrative embodiment, the additional technical computing workers 906 and 907 may be launched using any scheduler known to the technical computing client. In the case where the technical computing client uses "mpiexec" to launch the additional technical computing workers, these additional technical computing workers may automatically form a collaboration 910 amongst themselves. However, the call to iClientConn may still allow them to connect together with the first technical computing worker to form an overall collaboration. The operations of the other steps 911 and 912 are the same as described above with reference to FIG. 6.

The illustrative embodiment may also provide additional user APIs that enables a user to use a different size of collaborations so that the technical computing workers all leave the parallel collaboration, as shown in FIG. 7. In this case, the user may execute a command line as follows:

startParallelSession('numlabs', 3); or
startParallelSession('ParallelConfig', 'myConfig').

With the execution of this command line, the technical computing workers may exit the collaboration if they are no longer required. In some instances, such as when a technical computing worker is attached to a job manager, the worker may not leave the collaboration. The user may then continue to re-launch technical computing workers with a different effective "-numlabs" or "-ParallelConfig" setting.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:

1. A computer-implemented method for providing a dynamic collaboration of concurrent computing workers to execute a computational job in a concurrent computing environment, the method comprising:

initiating a plurality of concurrent computing workers on one or more computing devices, where:
the plurality of concurrent computing workers form a collaboration to execute the computational job,
the collaboration includes a first concurrent computing worker, and
the plurality of concurrent computing workers are initiated without using launching programs comprising:
mpirun, or
mpiexec;

receiving a user command indicating that the size of the collaboration should be dynamically increased by adding a second concurrent computing worker to the collaboration;

invoking, using the second concurrent computing worker, interface function calls to establish a communication channel with the first concurrent computing worker, the establishing performed using the interface function calls, the establishing allowing the second concurrent computing worker to dynamically join the collaboration when the collaboration is executing the computational job; and placing the second concurrent computing worker in an idle state when the second concurrent computing worker is disconnected from the collaboration, where the idle state allows the disconnected second concurrent computing worker to join another collaboration without running a launching program comprising:
mpirun, or
mpiexec.

2. The method of claim 1, wherein the first concurrent computing worker invokes a first interface function call for opening a port for the first concurrent computing worker.

3. The method of claim 2, wherein the first interface function call returns a description of the port.

4. The method of claim 1, wherein the first concurrent computing worker invokes a second interface function call for the first concurrent computing worker to accept the communication channel with the second concurrent computing worker.

5. The method of claim 1, further comprising:
enabling the second concurrent computing worker to invoke a third interface function call for connecting to the first concurrent computing worker.

6. The method of claim 5, wherein the second concurrent worker receives information on the first concurrent computing worker from an intermediary agent and uses the information to invoke the third interface function call.

7. The method of claim 6, wherein the information includes a network address of a port for the second concurrent computing worker.

8. The method of claim 1, wherein the interface function calls are provided as a shared library.

9. The method of claim 1, wherein the communication channel comprises an interface for message passing.

10. A computer-implemented method for providing a dynamic collaboration of concurrent computing workers to execute a computational job in a concurrent computing environment, the method comprising:

performing concurrent computing tasks on the computational job using a collaboration made up of the concurrent computing workers, where:
the performing is in response to a request received from a client associated with a user, and
the request identifies the number of concurrent computing workers in the collaboration;

invoking an interface function call using one of the concurrent computing workers in the collaboration;

disconnecting a communication channel with other concurrent computing workers in the collaboration in response to the invoking, where:
the disconnecting causes the other concurrent computing workers to dynamically leave the collaboration; and maintaining disconnected concurrent computing workers in an idle state, where:

the idle state allows the disconnected concurrent computing workers to join another collaboration without running a launching program comprising:
mpirun, or
mpiexec.

11. The method of claim 10, wherein the interface function call is provided as a shared library.

12. A system for providing a dynamic collaboration of concurrent computing workers to execute a computational job in a concurrent computing environment, the system comprising:
one or more computing devices, where:
the one or more computing devices are arranged in a collaboration to execute the computational job, where:
the collaboration receives a user command indicating that a concurrent computing worker should be added to the collaboration,
the one or more computing devices include one or more processors and are configured to:
execute instructions to run a plurality of concurrent computing workers, where:
one of the initiated plurality of concurrent computing workers is identified as a first concurrent computing worker, and
the plurality of concurrent computing workers are initiated without using launching programs comprising:
mpirun, or
mpiexec;
invoke, using a concurrent computing worker outside the collaboration, interface function calls to establish a communication channel with the first concurrent computing worker, the establishing allowing the concurrent computing worker outside the collaboration to dynamically join the collaboration when the collaboration is executing the computational job; and
place the concurrent computing worker that was outside the collaboration into an idle state when the concurrent computing worker is disconnected from the collaboration, where the idle state allows the disconnected concurrent computing worker to be available to join a subsequent collaboration.

13. The system of claim 12, wherein the first concurrent computing worker invokes a first interface function call for opening a port for the first concurrent computing worker.

14. The system of claim 13, wherein the first interface function call returns a description of the port.

15. The system of claim 12, wherein the first concurrent computing worker invokes a second interface function call for the first concurrent computing worker to accept the communication channel with the concurrent computing worker outside the collaboration.

16. The system of claim 13, wherein the concurrent computing worker outside the collaboration invokes a third interface function call for connecting to the first concurrent computing worker.

17. The system of claim 16, wherein the concurrent computing worker outside the collaboration receives information on the first concurrent computing worker from an intermediary agent and uses the information to invoke the third interface function call.

18. The system of claim 17, wherein the information includes a network address of a port for the concurrent computing worker outside the collaboration.

19. The system of claim 12, wherein the interface function calls are provided as a shared library.

20. The system of claim 12, wherein the communication channel comprises an interface for message passing.

21. A tangible computer-readable storage medium holding one or more instructions executable in an computing device for providing a dynamic collaboration of concurrent computing workers to execute a computational job in a concurrent computing environment, the medium holding the one or more instructions that when executed in the computing device performs the method of:
running a plurality of concurrent computing workers on one or more computing devices, where:
the plurality of concurrent computing workers form a collaboration to execute the computational job,
the collaboration includes a first concurrent computing worker, and
the plurality of concurrent computing workers are initiated without using launching programs comprising:
mpirun, or
mpiexec;
receiving a user command indicating that the size of the collaboration should be increased by adding a second concurrent computing worker to the collaboration;
invoking, using the second concurrent computing worker, interface function calls to establish a communication channel with the first concurrent computing worker, the establishing performed using the interface function calls, the establishing allowing the second concurrent computing worker to dynamically join the collaboration when the collaboration is executing the computational job; and
placing the second concurrent computing worker into an idle state when the second concurrent computing worker is disconnected from the collaboration, where the idle state allows the disconnected second concurrent computing worker to be available to join a subsequent collaboration.

22. The medium of claim 21, wherein the first concurrent computing worker invokes a first interface function call for opening a port for the first concurrent computing worker.

23. The medium of claim 22, wherein the first interface function call returns a description of the port.

24. The medium of claim 21, wherein the first concurrent computing worker invokes a second interface function call for the first concurrent computing worker to accept the communication channel with the second concurrent computing worker.

25. The medium of claim 21, further comprising:
enabling the second concurrent computing worker to invoke a third interface function call for connecting to the first concurrent computing worker.

26. The medium of claim 25, wherein the second concurrent computing worker receives information on the first concurrent computing worker from an intermediary agent and uses the information to invoke the third interface function call.

27. The medium of claim 26, wherein the information comprises a network address of a port for the second concurrent computing worker.

28. The medium of claim 21, wherein the interface function calls are provided as a shared library.

29. The medium of claim 21, wherein the communication channel comprises an interface for message passing.

30. A tangible computer-readable storage medium holding one or more instructions executable in a computing device for providing a dynamic collaboration of concurrent computing workers to execute a computational job in a concurrent computing environment, the medium holding the one or more instructions that when executed in the computing device performs the method of:

performing concurrent computing tasks on the computational job using a collaboration made up of the concurrent computing workers, where:
        the performing is in response to a request received from a client associated with a user, and
        the request identifies the number of concurrent computing workers in the collaboration;
    invoking an interface function call using one of the concurrent computing workers in the collaboration;
    disconnecting a communication channel with other concurrent computing workers in the collaboration in response to the invoking, where:
        the disconnecting causes the other concurrent computing workers to dynamically leave the collaboration; and
    maintaining disconnected concurrent computing workers in an idle state, where:
        the idle state allows the disconnected concurrent computing workers to join another collaboration without running a launching program comprising:
            mpirun, or
            mpiexec.

31. The medium of claim 30, wherein the interface function call is provided as a shared library.

32. A computer-implemented method for configuring a dynamic collaboration of concurrent computing workers to execute a computational job in a concurrent computing environment, the method comprising:

receiving a first user specified command;
    specifying a number of concurrent computing workers in response to the first user specified command;
    forming a collaboration for executing the computational job using the specified number of concurrent computing workers, where:
        the collaboration is formed via communication channels established between the specified number of concurrent computing workers,
        the concurrent computing workers are implemented on computing devices, and
        the concurrent computing workers in the collaboration are initiated without using a launching program comprising:
            mpirun, or
            mpiexec;
    processing tasks in the computational job using the specified number of concurrent computing workers;
    dissolving the collaboration by disconnecting the communication channels between the specified number of concurrent computing workers when the tasks in the computational job are processed;
    maintaining the disconnected concurrent computing workers in an idle state; and
    establishing a new collaboration using two or more of the disconnected concurrent computing workers in the idle state, where:
        the new collaboration is formed in response to a second user specified command,
        the new collaboration includes a communication channel between the two or more concurrent computing workers, and
        the new collaboration is configured to process another computational job on behalf of a user.

33. The method of claim 32, wherein the first concurrent computing worker is launched on one of the computing devices and the first concurrent computing worker launches the other concurrent computing workers in the collaboration.

34. A system for configuring a dynamic collaboration of concurrent computing workers to execute a computational job in a concurrent computing environment, the system comprising:

a processor executing instructions for:
        providing a user interface for specifying a number of concurrent computing workers to form a collaboration for executing the computational job, wherein the collaboration includes a first concurrent computing worker;
        receiving a first user command;
        initiating the number of concurrent computing workers on the one or more computing devices in response to the received first user command, wherein the number of concurrent computing workers establish a communication channel with the first concurrent computing worker, where:
            the number of concurrent computing workers are initiated without using a launching program comprising:
                mpirun, or
                mpiexec;
        receiving a second user command;
        initiating a new concurrent computing worker, where the new concurrent computing worker joins the collaboration while the collaboration is executing the computational job, where:
            the new concurrent computing worker is outside the collaboration when the initiating is performed, and
            the new concurrent computing worker is in an idle state when the new concurrent computing worker is outside the collaboration; and
        disconnecting the new concurrent computing worker from the collaboration and placing the disconnected concurrent computing worker in an idle state, where the idle state allows the disconnected concurrent computing worker to be available for joining another collaboration.

35. The system of claim 34, wherein the first user command initiates the first concurrent computing worker and enables the first concurrent computing worker to initiate the other concurrent computing workers in the collaboration.

36. A tangible computer-readable storage medium holding one or more instructions executable in a computing device for configuring a dynamic collaboration of concurrent computing workers to execute a computational job in a concurrent computing environment, the medium holding the one or more instructions that when executed in the computing device performs the method of:

receiving a first user specified command;
    specifying a number of concurrent computing workers in response to the first user specified command;
    forming a collaboration for executing the computational job using the specified number of concurrent computing workers, where:
        the collaboration is formed via communication channels established between the specified number of concurrent computing workers, and
        the concurrent computing workers in the collaboration are initiated without using a launching program comprising:
            mpirun, or
            mpiexec;
    processing tasks in the computational job using the specified number of concurrent computing workers;

dissolving the collaboration by disconnecting the communication channels between the specified number of concurrent computing workers when the tasks in the computational job are processed;

maintaining the disconnected concurrent computing workers in an idle state; and establishing a new collaboration using two or more of the disconnected concurrent computing workers in the idle state, where:

the new collaboration is formed in response to a second user specified command, the new collaboration includes a communication channel between the two or more concurrent computing workers, and the new collaboration is configured to process another computational job on behalf of a user.

37. The medium of claim 36, where:

the new collaboration includes a first concurrent computing worker that is launched on a computing device, and the first concurrent computing worker launches the other concurrent computing programs in the new collaboration.

* * * * *

UNITED STATES PATENT AND TRADEMARK OFFICE
CERTIFICATE OF CORRECTION

PATENT NO. : 7,765,561 B1  Page 1 of 1
APPLICATION NO. : 11/272307
DATED : July 27, 2010
INVENTOR(S) : Edric Ellis

It is certified that error appears in the above-identified patent and that said Letters Patent is hereby corrected as shown below:

On the Title pg Item (56) (Other Publications, line 3), please change "Proceddings" to --Proceedings--.

On the Title pg Item (56) (Other Publications, line 4), please change "Proincples" to --Principles--.

Signed and Sealed this

Second Day of November, 2010

David J. Kappos
*Director of the United States Patent and Trademark Office*